United States Patent
Goetz et al.

(10) Patent No.: US 8,147,173 B2
(45) Date of Patent: Apr. 3, 2012

(54) ADAPTER FOR OPERATING A KEYHOLE SAW ON A DRIVING MACHINE

(75) Inventors: Renato Goetz, Unterentfelden (CH); Daniel Grolimund, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 544 days.

(21) Appl. No.: 12/439,874

(22) PCT Filed: Mar. 19, 2008

(86) PCT No.: PCT/EP2008/053315
§ 371 (c)(1),
(2), (4) Date: Mar. 4, 2009

(87) PCT Pub. No.: WO2008/138665
PCT Pub. Date: Nov. 20, 2008

(65) Prior Publication Data
US 2010/0054885 A1    Mar. 4, 2010

(30) Foreign Application Priority Data
May 11, 2007 (DE) .......................... 10 2007 022 186

(51) Int. Cl.
*B23B 51/04* (2006.01)

(52) U.S. Cl. ....................................... 408/204; 408/238

(58) Field of Classification Search .......... 408/204–209, 408/238–240; *B23B 51/04, 51/05*
See application file for complete search history.

(56) References Cited

U.S. PATENT DOCUMENTS

| 4,669,928 | A | | 6/1987 | Mediavilla | |
|---|---|---|---|---|---|
| 5,246,317 | A | | 9/1993 | Koetsch et al. | |
| 5,352,071 | A | * | 10/1994 | Cochran et al. | 408/204 |
| 5,658,102 | A | * | 8/1997 | Gale | 408/1 R |
| 6,120,221 | A | * | 9/2000 | Alm | 408/204 |
| 6,623,220 | B2 | * | 9/2003 | Nuss et al. | 408/204 |
| 7,104,738 | B2 | * | 9/2006 | Cantlon | 408/204 |
| 7,824,137 | B2 | * | 11/2010 | Vasudeva et al. | 408/204 |
| 2009/0116917 | A1 | * | 5/2009 | Brunson | 408/204 |

FOREIGN PATENT DOCUMENTS

| DE | 601 04 177 | 8/2005 |
|---|---|---|
| EP | 1 193 014 | 4/2002 |
| WO | 2005/000506 | 1/2005 |
| WO | 2005/002310 | 1/2005 |

* cited by examiner

*Primary Examiner* — Daniel Howell
(74) *Attorney, Agent, or Firm* — Michael J. Striker

(57) ABSTRACT

An adapter for operating a keyhole saw (10) on a driving machine includes a driving section (17; 117) for absorbing torque and a threaded section (18; 118) screwed into a threaded hole (20) in the keyhole saw (10). A driving segment (16; 116) is offset radially relative to the adapter axis and is inserted in a form-fit manner into a receiving hole (21) present in the keyhole saw (10). The driving segment (16; 116) is located in an axially extending manner on the end of a driving element (12; 112) which includes the driving element section (17; 117). The threaded section (17; 117) is formed on a threaded mandrel (13; 113) which is situated in the driving element (12; 112) and is non-detachably connected thereto. The threaded mandrel (13; 113) is held in the driving element (12; 112) in a rotatable manner to be axially displaceable to a limited extent.

17 Claims, 3 Drawing Sheets

ADAPTER FOR OPERATING A KEYHOLE SAW ON A DRIVING MACHINE

CROSS-REFERENCE

The invention described and claimed hereinbelow is also described in PCT/EP2008/053315, filed on Mar. 19, 2008 and DE 10 2007 022 186.1, filed on May 11, 2007. This German Patent Application, whose subject matter is incorporated here by reference, provides the basis for a claim of priority of invention under 35 U.S.C. 119 (a)-(d).

BACKGROUND OF THE INVENTION

The present invention is directed to an adapter for operating a keyhole saw on a driving machine, in particular an electric hand-held drill.

A known part of an adapter which forms a "power change system" for receiving a keyhole saw (EP 1 193 014 A1 and DE 601 04 177 T2) has the shape of a hollow hexagonal prism which is provided, at one end, with a threaded section around its circumference, and, close to the other end, it is provided with a circumferential, concave detent groove. The threaded section is screwed into a central threaded hole of the keyhole saw, and the adapter—having the keyhole saw attached thereto—is slid via its hexagonal prism into a drive sleeve having an inner, hexagonal sleeve wall until a detent ball which is held in a radial bore in the sleeve wall drops into the detent groove and holds the adapter in a non-displaceable manner. A sliding sleeve which is displaceable against the restoring force of a compression spring is situated on the drive sleeve for locking and unlocking the adapter. In the locking position, the sliding sleeve closes the radial bore to the outside, thereby blocking the detent ball which has dropped into the detent groove of the adapter and preventing it from being displaced in the radial direction. In the unlocking position, which the sliding sleeve assumes after following a displacement path against the restoring force of the compression spring, the radial bore is congruent with a recess in the inner wall of the sliding sleeve, thereby allowing the detent ball to escape radially outwardly when one of the groove flanks of the detent groove in the adapter strikes the detent ball when the adapter is pulled out of the drive sleeve, or when the adapter is slid into the drive sleeve. The drive sleeve includes a hexagonal receiving shank which is placed in the chuck of an electric hand-held power tool. When drilling is performed using the keyhole saw, a "pilot bit" is typically used to guide the keyhole saw in an exact manner. The pilot bit includes a hexagonal shank and a circumferential detent groove in the hexagonal shank, and it is held in a bit-connecting piece in a non-rotatable manner via the hexagonal shank and via a detent ball which drops into the detent groove in the hexagonal shank of the pilot bit, the detent ball being held in an axially non-displaceable manner in the bit-connecting piece in a radial bore. The bit-connecting piece is accommodated in the adapter and extends via a hexagonal segment part into the similarly formed hollow interior of the shank of the drive sleeve.

Given large diameters of the keyhole saw, to prevent the thread from stripping when high torques are transferred, two diametrically opposed driving holes are provided in the keyhole saw, and two axially extending driving pegs which extend into the driving holes are situated on the end face—which faces the keyhole saw—of the drive sleeve. The transfer of torque from the electric hand-held power tool via the drive sleeve to the keyhole saw therefore takes place via the driving pegs and the driving holes, and the load is relieved from the threaded connection between the keyhole saw and the adapter. The connection between the keyhole saw and the electric hand-held power tool is established by screwing the adapter via its threaded section tightly into the threaded hole of the keyhole saw, and then inserting the adapter into the drive sleeve until the driving pegs strike the keyhole saw. After the driving pegs are aligned with the driving holes, the adapter is slid completely into the drive sleeve, and the driving pegs enter the driving holes; the sliding sleeve must be pushed back against the force of the restoring spring until the detent groove of the adapter moves under the detent ball, then the detent ball drops into the detent groove. After the sliding sleeve is released, the restoring spring forces the sliding sleeve back, and the adapter is locked in place in the drive sleeve in an axially non-displaceable manner. After the pilot bit is inserted, the drive sleeve is inserted via its hexagonal shank into the chuck of the electric hand-held drill.

In the case of a known adapter, which is of a "standard design" and may be inserted directly into the chuck of an electric hand-held power tool, the driving pegs and threaded section are also situated on two separate components which are placed on the keyhole saw individually, while being joined together, and are then detachably connected to one another. The hollow component which includes the threaded section, into which the pilot bit is also inserted, includes a hexagonal clamping shank which is inserted into the chuck of the electric hand-held power tool, while the component on which the driving pegs are mounted is attached via a radial screw to the threaded section and the component on which the clamping shank is mounted.

SUMMARY OF THE INVENTION

The adapter according to the present invention for receiving a keyhole saw having the features mentioned in claim 1 has the advantage that the adapter is a single piece, and it is possible to perform these two procedures in one working step: via rotation, align the driving pegs which are located on the adapter with the driving holes which are present in the keyhole saw after the threaded mandrel is screwed into the threaded hole, then insert the driving pegs into the driving holes as required, using a linear motion; a play-free connection is then established between the keyhole saw and the adapter. In contrast to the known adapters, in the case of which the threaded section and the driving pegs are distributed on components which are separable from one another, are installed separately with the keyhole saw and must then be connected to one another, in this case, the threaded section and the driving pegs are combined to form one assembly and are not separable from one another, thereby ensuring that none of the components may become lost.

When the driving section is designed accordingly, the adapter according to the present invention may be clamped directly in the chuck of an electric hand-held power tool, and it may be clamped directly in the chuck of an electric hand-held power tool using the known, above-described drive sleeve of the "power change system".

Via the measures mentioned in the further claims, advantageous developments and improvements of the adapter described in claim 1 are made possible.

BRIEF DESCRIPTION OF THE DRAWINGS

The present invention is described in greater detail in the description that follows, with reference to embodiments depicted in the drawings.

DETAILED DESCRIPTION OF THE PREFERRED EMBODIMENTS

Figure 1:
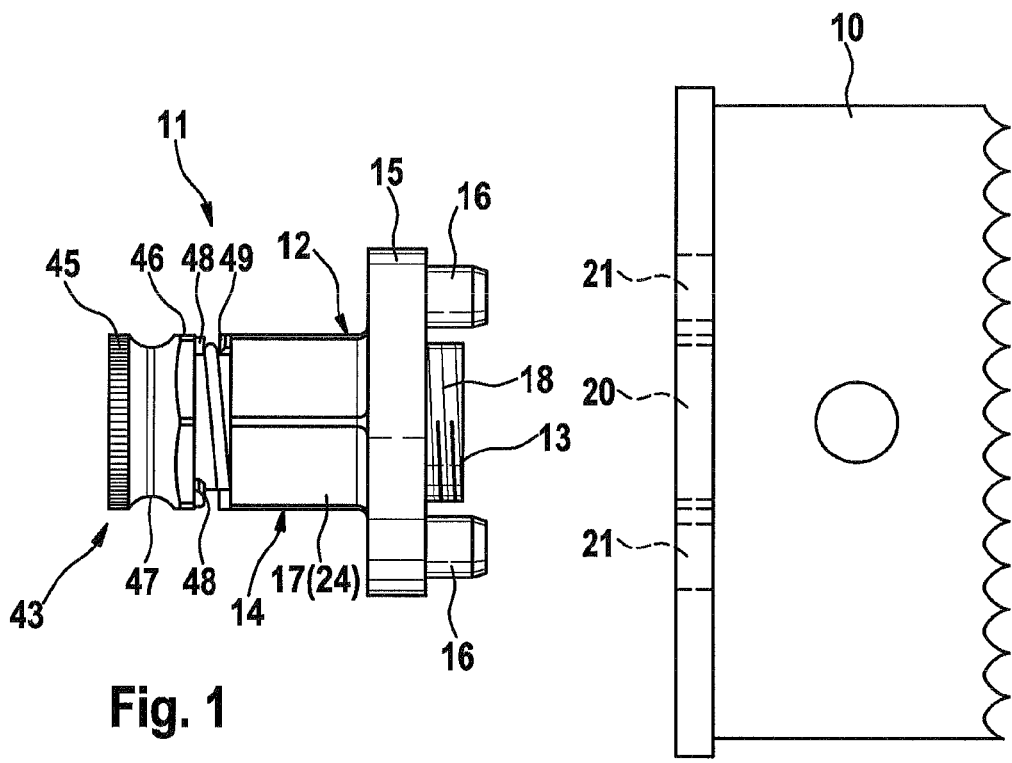
FIG. 1 shows a side view of a keyhole saw and an adapter for receiving the keyhole saw.
Figure 2:
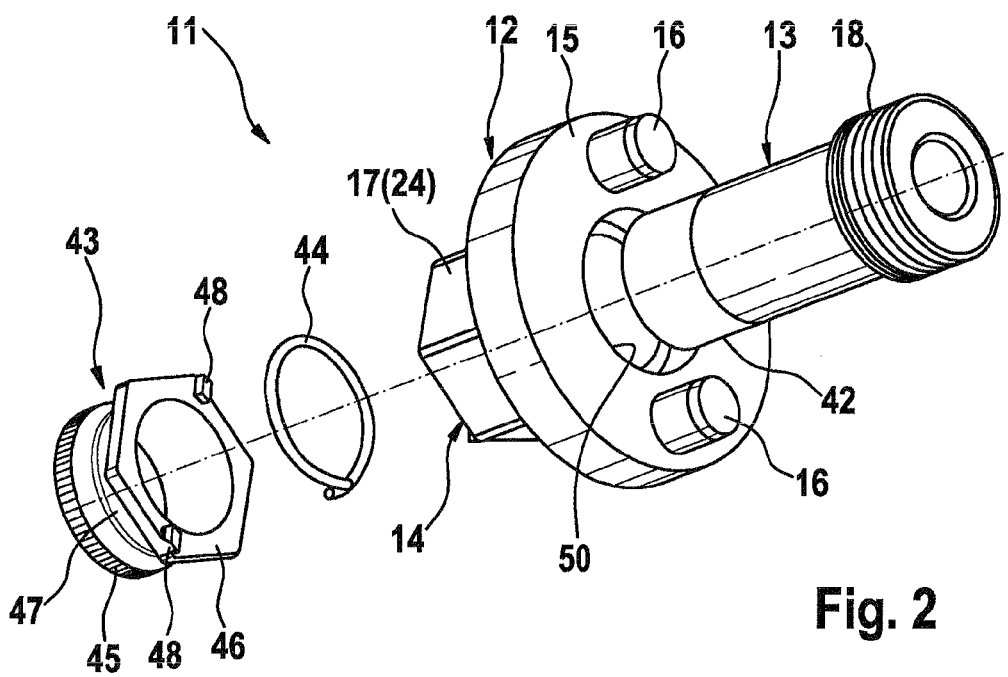
FIG. 2 shows an exploded view of the adapter in FIG. 1.
Figure 4:
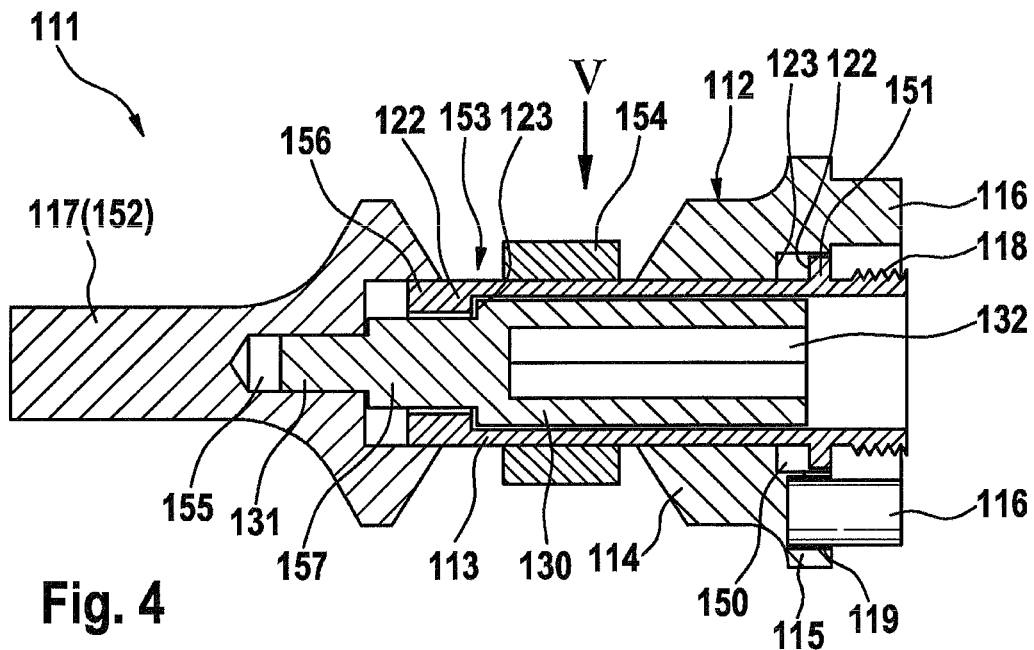
FIG. 4 shows a longitudinal sectional view of an adapter according to a second embodiment.
Figure 5:
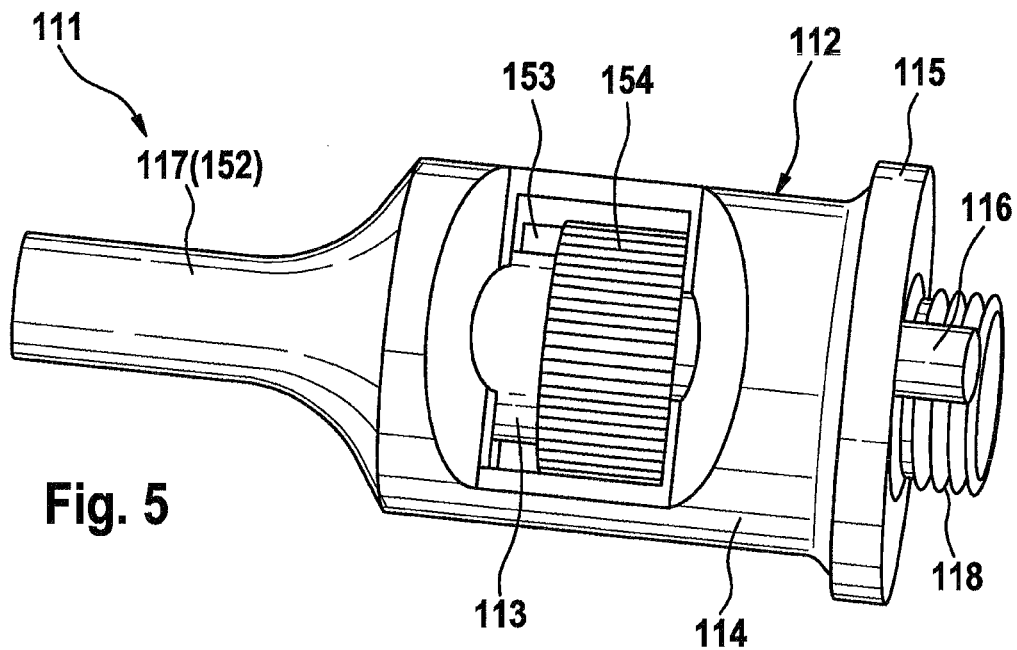
FIG. 5 shows a perspective view of the adapter in the direction of arrow V in FIG. 4.

Adapter 11 for receiving a keyhole saw 10, which is shown in an exploded view and a side view in FIGS. 1 and 2, is designed to be part of a "power change system" which may be operated in various configurations using an electric hand-held power tool, while adapter 111 shown in FIGS. 4 and 5 is designed to be inserted into the chuck of an electric hand-held power tool.

Adapters 11 and 111 both include a driving element 12 and 112 and a hollow cylindrical threaded mandrel 13 and 113 which is situated in driving element 12 and 112 in a rotatable and axially displaceable manner. Driving element 12 and 112 includes a driving element body 14 and 114, and a driving flange 15 and 115 which extends thereon as a single piece, the flange surface—that faces away from driving element body 14 and 114—of which forms a mating surface for keyhole saw 10. Two driving pegs 16 and 116 are situated diametrically to the driving axis on driving flange 15 and 115, and they extend past the exposed flange surface—which forms the mating surface—parallel to the driving axis. Driving pegs 16 and 116 are designed as single pieces with driving flange 15 and 115, as shown in the top part of FIGS. 3 and 4, or they are inserted as separate components into related axial bores 19 and 119, and are pressed or staked therein, as illustrated in the bottom part of FIGS. 3 and 4. Driving element body 14 and 114 includes a driving section 17 and 117 via which driving element 12 and 112 absorbs a torque which is derived from the electric hand-held power tool.

Threaded mandrel 13 and 113, which is rotatably situated in driving element 12 and 112, extends on the flange side of driving element 12 and 112 out of driving element 12 and 112, and it is provided in the end region with a threaded section 18 and 118 which is screwed into a central threaded hole 20 present in keyhole saw 10. Two diametrically opposed receiving holes 21—into which driving pegs 16 and 116 of driving element 12 and 112 may enter—are provided in keyhole saw 10 at the same radial distance from one another that exists between driving pegs 16 and driving element body axis 14. The displacement path of threaded mandrel 13 and 113 is limited by two axially interspaced stops 22 and 122 on threaded mandrel 13 and 113, and by two counter-stops 23 and 123—which interact with stops 22 and 122—on driving element 12 and 112. Stops 22 and 122, and counter-stops 23 and 123 are situated such that the displacement path of threaded mandrel 13 and 113 in driving element 14 and 114 is designed to be so great that the end—on which threaded section 18 and 118 is provided—of threaded mandrel 13 and 113 may be pulled back behind the exposed front ends of driving pegs 16 and 116, so that driving pegs 16 and 116 may be inserted into receiving holes 21 in keyhole saw 10 before threaded section 18 and 118 is screwed into threaded hole 20 of keyhole saw 10. A central recess 50 and 150 which leads into the flange surface which is used as the mating surface for keyhole saw 10 is provided in driving flange 15 and 115. Threaded mandrel 13 and 113 includes, on the end of its threaded section 18 and 118, a circumferential radial collar 51 and 151 which extends into recess 50 and 150. Radial collar 51 and 151 forms stop 22 and 122, and the base of recess 50 and 150 forms counter-stop 23 and 123 which interacts with stop 22 and 122 in order to limit the displacement path of threaded mandrel 13 and 113 in driving element 12 and 112.

Figure 3:
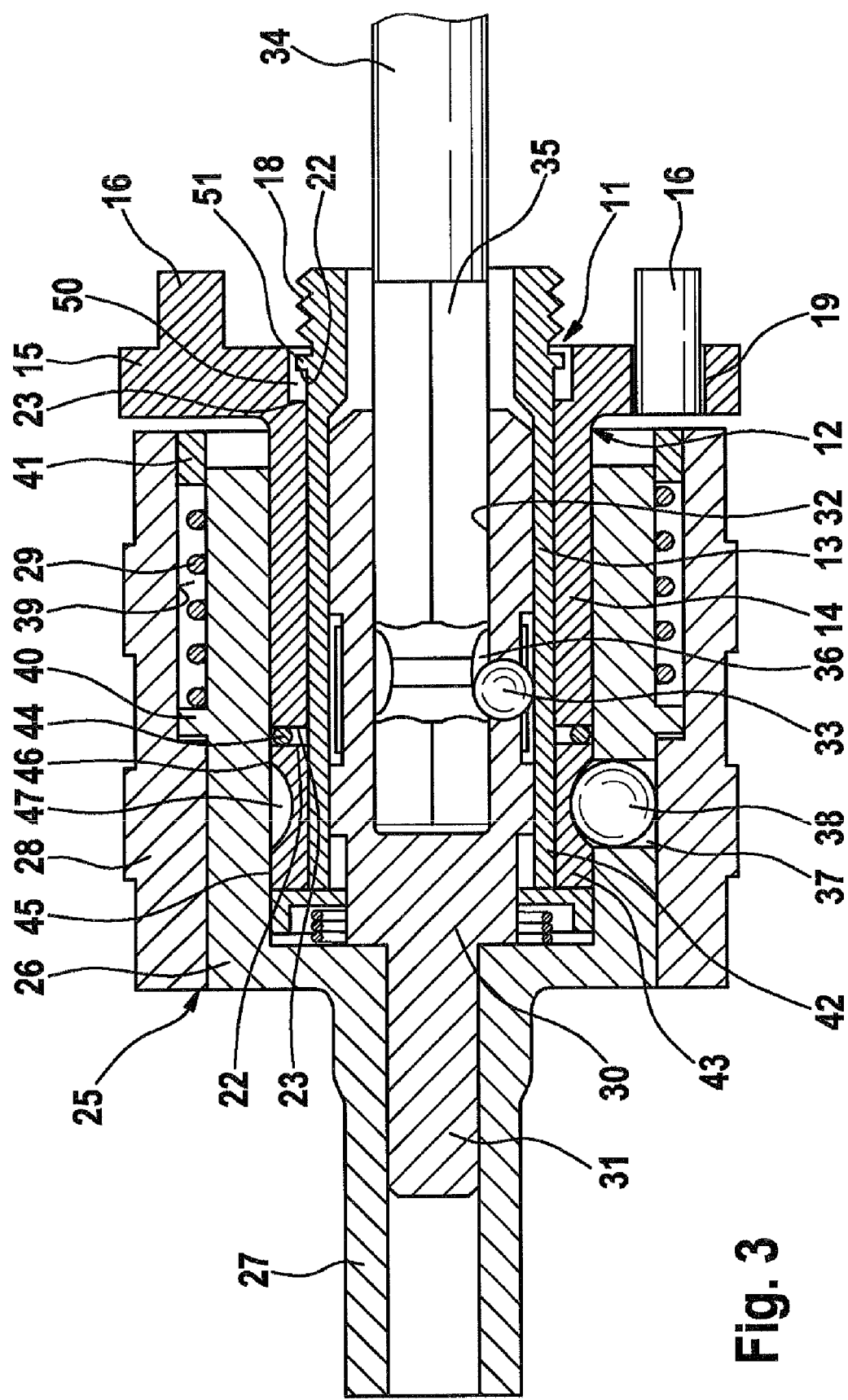
FIG. 3 shows a longitudinal sectional view of a coupling part of a "power change system" with the adapter shown in FIGS. 1 and 2 installed.

In the case of adapter 11 depicted in FIGS. 1 through 3, driving section 17 is designed as an external hexagon 24 for insertion, in a form-fit manner, into a coupling piece 25—which is also referred to as a base mechanism—of a power change system. Coupling part 25 is known, and it is described in detail in EP 1 193 014 A1 which is documented above, and will therefore be described only briefly below.

Coupling part 25 includes a drive sleeve 26 which includes a hexagonal shank 27 for insertion into the chuck of an electric hand-held power tool, and a sliding sleeve 28 which may be displaced on drive sleeve 26 against the force of a compression spring 29. Coupling part 25 also includes a bit-connecting piece 30 which is inserted in adapter 11 and extends via a hexagonal shank 31 into a similarly designed hexagonal hollow cavity in hexagonal shank 27 of drive sleeve 26. Bit-connecting piece 30 includes a central recess 32, the interior wall of which has a hexagonal design, and a radially displaceable detent ball 33. A pilot bit 34 for guiding keyhole saw 10 using a hexagonal shank 35 is inserted into bit-connecting piece 30, and it is locked in an axially non-displaceable manner via a detent ball 33 which drops into detent groove 36 in hexagonal shank 35.

The inner wall of drive sleeve 26 is also hexagonal in design; adapter 11 with outer hexagon 24 on driving element 12 is therefore held in drive sleeve 26 in a form-fit manner in the direction of rotation. In order to hold adapter 11 in an axially non-displaceable manner, a detent ball 38 is held in a radially displaceable manner in a radial bore 37 of drive sleeve 26, detent ball 38 extending radially outwardly from inner wall of drive sleeve 38 and being secured against falling out of radial bore 37 by sliding sleeve 28. A recess 39 which extends to the end of sliding sleeve 28 is formed in the inner wall of sliding sleeve 28. A radial flange 40 which is formed on drive sleeve 26 extends into recess 39. A compression spring 29 is situated in recess 39, and bears against radial flange 40 and against a ring 41 which is inserted on the end side in recess 39 and is attached to sliding sleeve 28. When sliding sleeve 28 is slid to the left as shown in FIG. 3, and compression spring 29 is compressed, a part of recess 39 extends over detent ball 38 so that detent ball 38 may move radially outwardly into recess 39, thereby enabling it to move behind the inner wall of drive sleeve 26.

As shown in FIGS. 1 through 3, threaded mandrel 13 which is accommodated in driving element 12 extends via an end section 42—which faces away from threaded section 18—beyond driving element body 14. A holding ring 43 is attached, e.g. via pressing or shrink-fitting, on end section 42, and a spring element 44 designed as a snap ring having an axially-acting spring force is installed, spring element 44 bearing against the end surface of driving element body 14 and against holding ring 43. Holding ring 43 includes, on its free end, an annular section 45 which is knurled, and, on its end facing driving element body 14, it includes a hexagonal annular section 46 which is matched to outer hexagon 24 of driving element body 14. A circumferential, concave detent groove 47 is situated between annular sections 45, 46, and is used, in combination with detent ball 38 of drive sleeve 26 of coupling part 25, to lock adapter 11 in coupling part 25. Two radial stops 48 (FIG. 2) which extend axially outwardly are diametrically opposed on the end surface—which faces driving element body 14—of holding ring 43, radial stops 48 interacting with two counter-stops 49—which are situated on the end surface of driving element body 14—in such a manner that radial stops 48 and counter-stops 49 engage in one another—at the end of the procedure to screw threaded section 18 into central threaded hole 20 of keyhole saw 10—when the hexagon on annular section 46 of holding ring 43 becomes aligned with outer hexagon 24 of driving element body 14. Spring element 44 ensures that this orientation of holding ring 43 and driving element body 14 is retained during assembly.

In the embodiment shown in FIGS. 1 through 3, the other stop 22 which is used to limit the displacement path of threaded mandrel 13, is located on threaded mandrel 13, and prevents threaded mandrel 13 from falling out of driving element 12, is formed by holding ring 43 and the other counter-stop 23 of driving element body 14, which interacts with stop 22.

To assemble keyhole saw 10 and adapter 11, complete adapter 11—as shown, assembled, in FIG. 1—is placed on keyhole saw 10 in a manner such that driving pegs 16 enter receiving holes 21 in keyhole saw 10. Threaded section 18 of threaded mandrel 13 is then screwed into threaded hole 20 of keyhole saw 10; to do this, threaded mandrel 13 is rotated manually using knurled annular section 45. Spring element 44 becomes increasingly loaded as threaded section 18 is screwed in further. When the end of the screw-in procedure has been reached, radial stops 48 on holding ring 43 bear against counter-stops 49 on driving element body 14, and hexagonal annular section 46 of holding ring 43 is simultaneously aligned with outer hexagon 24 of driving element body 14. Bit-connecting piece 30 with pilot bit 34 inserted is now introduced into threaded mandrel 13, and adapter 11 is slid into drive sleeve 26. Sliding sleeve 28 is thereby displaced manually to the left—as shown in FIG. 3—until recess 32 lies over detent ball 33. Entire adapter 11 is slid inward until detent ball 33 drops into detent groove 47 in holding ring 43. If sliding sleeve 28 is now released, it is returned via the action of compression spring 29 to its locking position shown in FIG. 3, in which detent ball 33 extends into detent groove 47 in a radially non-displaceable manner and locks adapter 11 in drive sleeve 26 in an axially non-displaceable manner.

In the case of adapter 111 which is shown in FIGS. 4 and 5 and is clamped directly in the chuck of an electric hand-held power tool, driving element section 117 on driving element body 114 of driving element 112 is formed by a stub chuck 152 which extends as a single piece on the end—which faces away from driving element flange 115—of driving element body 114. Driving element body 114 includes a radially continuous recess 153, through which hollow threaded mandrel 113 passes. A manually grippable rotation aid in the form of a knurled wheel 154 is attached to threaded mandrel 113 in the region of recess 153. Via knurled wheel 154, threaded mandrel 113 may be rotated in order to screw threaded section 118 into threaded hole 20 of keyhole saw 10. Bit-connecting piece 130 is inserted into threaded mandrel 113 and extends via hexagonal shank 131 into a corresponding blind hole 155 in stub chuck 152, thereby being carried along in the direction of rotation in a form-fit manner. Bit-connecting piece 130 also includes a recess 132 having a hexagonal inner wall for receiving the hexagonal shank of the pilot bit, as shown in FIG. 3.

Threaded mandrel 113 includes, on its end which faces away from threaded section 118, an end section 156 having a reduced inner diameter. Cylindrical bit-connecting piece 130 includes a cylindrical section 157 which has a reduced diameter and is inserted through section 156 of threaded mandrel 113. The radial shoulders which are formed at the transitions of sections 156 and 157 form the other stop 122 on threaded mandrel 113 and counter-stop 123—which interacts with stop 122—on driving element 112 to limit the axial displacement path of threaded mandrel 113 in driving element 112, thereby also preventing threaded mandrel 113 from falling out of driving element 112. Cylindrical section 157 is much larger in its axial length than is section 156 on threaded mandrel 113, thereby ensuring that threaded mandrel 113 may be displaced axially.

What is claimed is:

1. An adapter for operating a keyhole saw (10) on a driving machine, in particular an electric hand-held drill, comprising a driving element section (17; 117) for absorbing torque, and a threaded section (18; 118) to be screwed into a threaded hole (20) in the keyhole saw (10), and comprising at least one driving segment (16; 116) which is offset radially relative to the adapter axis, and which is inserted in a form-fit manner into at least one receiving hole (21) present in the keyhole saw (10), wherein the at least one driving segment (16; 116) is located in an axially extending manner on the end—which faces the keyhole saw (10)—of a driving element (12; 112) which includes the driving element section (17; 117), the threaded section (17; 117) is formed on a threaded mandrel (13; 113) which is situated in the driving element (12; 112) and is non-detachably connected thereto, and the threaded mandrel (13; 113) is held in the driving element (12; 112) in a rotatable manner and such that it is axially displaceable to a limited extent, wherein the driving element (12; 112) includes a driving element body (14; 114) on which the driving segment (16; 116) is formed, and a driving flange (15; 115) which extends the driving segment (16; 116) as a single piece, and the flange surface of which that faces away from the driving element body (14; 114) forms a mating surface for the keyhole saw (10), wherein the threaded mandrel (13; 113) extends, via the threaded section (18; 118) and on the flange-side end of the driving element (12; 112), beyond the driving element (12; 112); and the displacement path of the threaded mandrel (13; 113) in the driving element (12; 112) is designed to be at least so great that the end—which faces away from the flange-side end of the driving element (12; 112)—of the threaded section (18; 118) may be slid back behind the exposed front end of the driving segment (16; 116).

2. The adapter as recited in claim 1, wherein two driving segments (16; 116) which extend past the mating surface parallel to the driving axis are situated in a diametrically opposed manner on the driving flange (15; 115).

3. The adapter as recited in claim 2, wherein the driving segments (16; 116) are inserted into flange holes (19; 119) and are held there via pressing.

4. The adapter as recited in claim 2, wherein the driving segments (16; 116) are designed as single pieces with the driving flange (15; 115).

5. An adapter for operating a keyhole saw (10) on a driving machine, in particular an electric hand-held drill, comprising a driving element section (17; 117) for absorbing torque, and a threaded section (18; 118) to be screwed into a threaded hole (20) in the keyhole saw (10), and comprising at least one driving segment (16; 116) which is offset radially relative to the adapter axis, and which is inserted in a form-fit manner into at least one receiving hole (21) present in the keyhole saw (10), wherein the at least one driving segment (16; 116) is located in an axially extending manner on the end—which faces the keyhole saw (10)—of a driving element (12; 112) which includes the driving element section (17; 117), the threaded section (17; 117) is formed on a threaded mandrel (13; 113) which is situated in the driving element (12; 112) and is non-detachably connected thereto, and the threaded mandrel (13; 113) is held in the driving element (12; 112) in a rotatable manner and such that it is axially displaceable to a limited extent, wherein the driving element (12; 112) includes a driving element body (14; 114) on which the driving segment (16; 116) is formed, and a driving flange (15; 115) which extends the driving segment (16; 116) as a single piece, and the flange surface of which that faces away from the driving element body (14; 114) forms a mating surface for the keyhole saw (10), wherein a stub chuck (152) which forms the driving element section (117) extends driving element body (114) as a single piece on its end facing away from the driving flange (115), and wherein the driving element body (114) includes a radially continuous recess (153) through which the threaded mandrel (113) extends axially, and a grippable rotation aid, in the form of a knurled wheel (154), is attached to the threaded mandrel (113) in the region of the recess (153).

6. The adapter as recited in claim 1, wherein the displacement path of the threaded mandrel (13; 113) is limited by axially interspaced stops (22; 122) on the threaded mandrel (13; 113), and by counter-stops (23; 123) which are located on the driving element (12; 112) and interact with the stops (22; 122).

7. The adapter as recited in claim 2, wherein the driving element body (14) includes an outer hexagon (24) which forms the driving element section (17) and which is to be inserted, in a form-fit manner, into a coupling part (25) which may be inserted into the driving machine.

8. The adapter as recited in claim 7, wherein the threaded mandrel (13) which is located inside the driving element (12) extends—via an end section (42) which faces away from the threaded section (13)—beyond the driving element (12), and a holding ring (43) is attached to the projecting end section (42), having been shrunk-fit thereon, and the holding ring (43) forms a stop (22) for limiting the displacement path of the threaded mandrel (13).

9. The adapter as recited in claim 8, wherein the holding ring (43) includes a knurled annular section (45).

10. The adapter as recited in claim 8, wherein the holding ring (43) includes a concave detent groove (47) which is formed in the outer surface of the ring, and which is designed to accommodate a locking element, in the form of a detent ball (38), which is held in the coupling part (25).

11. The adapter as recited in claim 10, wherein the holding ring (43) includes a hexagonal annular section (46) which is matched to the outer hexagon (24) of the driving element section (17) on the driving element body (14).

12. The adapter as recited in claim 11, wherein the detent groove (47) is located between the two annular sections (45, 46).

13. The adapter as recited in claim 7, wherein a spring element (44), in the form of a snap ring, bears via axially directed spring force between the holding ring (43) and the end face of the driving element body which faces the holding ring (43).

14. The adapter as recited in claim 13, wherein an axially extending radial stop (48) is located on the holding ring (43), and a counter-stop (49) is located on the driving element (12) and extends axially away from its end face, the radial stop (48) and counter-stop (49) being designed such that they abut one another at the end of the procedure of screwing the threaded section (18) into the threaded hole (20) formed in the side of the keyhole saw when the outer hexagon (24) on the driving element body (14) and the hexagonal annular section (46) on the holding ring (43) are aligned with one another.

15. The adapter as recited in claim 2, wherein a stub chuck (152) which forms the driving element section (117) extends driving element body (114) as a single piece on its end facing away from the driving flange (115).

16. The adapter as recited in claim 15, wherein the driving element body (114) includes a radially continuous recess (153) through which the threaded mandrel (113) extends axially, and a grippable rotation aid, in the form of a knurled wheel (154), is attached to the threaded mandrel (113) in the region of the recess (153).

17. The adapter recited in claim 1, wherein the threaded mandrel (13; 113) is hollow-cylindrical in design, and a bit-connecting piece (30; 130) which is used to insert a pilot bit (34) is situated in the threaded mandrel (13; 113).

\* \* \* \* \*